United States Patent Office 3,531,510
Patented Sept. 29, 1970

3,531,510
TRIMETHYL OCTENE NITRILES
Jack H. Blumenthal, Oakhurst, N.J., assignor to International Flavors & Fragrances, Inc., New York, N.Y., a corporation of New York
No Drawing. Filed Aug. 21, 1967, Ser. No. 661,813
Int. Cl. C07c 121/30
U.S. Cl. 260—465.9
8 Claims

ABSTRACT OF THE DISCLOSURE

This disclosure describes methods for the preparation and isolation of a variety of 5,7,7-trimethyl-2-octenyl nitriles and 5,7,7-trimethyl-3-octenyl nitriles by condensation of cyanoacetic acid with 3,5,5-trimethyl hexanal in the presence of an amine or an amine salt at a temperature of from about 40° C. to 180° C. A mixture of nitriles is produced in the condensation reaction. The relative proportion of each nitrile in the mixture can be controlled by control of the alkalinity of the reaction medium. The compounds and mixtures are useful as olfactory agents.

This invention relates to novel unsaturated octene nitriles and to the preparation of these compounds. It also relates to perfume compositions containing effective amounts of one or more of these valuable compounds as olfactory ingredients.

More particularly, this invention relates to certain unsaturated aliphatic nitriles characterized by seven carbon atoms in a straight chain attached to the nitrile group, a methyl group on the number five carbon atom, two methyl groups on the number seven carbon atom and one point of carbon-carbon unsaturation in the said chain.

The compounds of this group may be represented by the formula

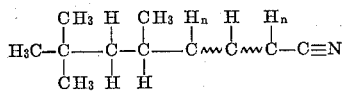

wherein the wavy line (∿) in the 2 or 3 position may represent a single or double bond and $n$ is 1 or 2 depending upon whether the double bond is in the 2 or 3 position and is sufficient to satisfy the carbon valences. Illustrative of the preferred materials falling within this group are:

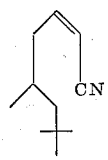

cis-5,7,7-trimethyl-2-octene nitrile
(Compound I)

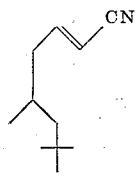

trans-5,7,7-trimethyl-2-octene nitrile
(Compound II)

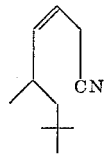

Cis-5,7,7-trimethyl-3-octene nitrile
(Compound III)

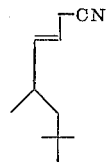

trans-5,7,7-trimethyl-3-octene nitrile
(Compound IV)

In accordance with the process of this invention, the trimethyl-octenenitriles described above are prepared by the reaction of cyanoacetic acid with 3,5,5-trimethyl hexanol in the presence of a condensation catalyst. The reaction is preferably conducted in an organic solvent medium at an elevated temperature and at approximately atmospheric pressure. In a preferred form, a decarboxylation agent may be added to the reaction system after the reaction has been substantially completed to aid in finishing the reaction. Such decarboxylation agent can be a heavy metal salt such as a cupric carboxylate and its equivalents, as for example, cupric acetate.

The condensation catalyst employed is preferably an amine or amine salt. The amine condensation catalyst may be a primary, secondary or tertiary amine, and may be heterocyclic, aromatic, aliphatic or cycloaliphatic. Suitable amine condensation catalysts include piperidine, pyridine, cyclohexyl amine, aniline, hydroxy alkanolamines such as triethanolamine, and para-toluidene. Suitable amine salt condensation catalysts include the organic and inorganic salts of these amines, especially the mineral and saturated aliphatic carboxylic acid salts containing up to five carbon atoms in the acid moiety. The condensation agents found particularly useful are pyridine, triethanolamine, and ammonium acetate.

A variety of organic solvents can be employed as the medium for effecting the reaction. Aromatic hydrocarbon solvents such as benzene and alkyl substituted benzenes including xylene, toluene, ethyl benzene and the like can be employed. It is preferred to use solvents such as benzene or toluene which are relatively inexpensive and form azeotropic mixtures with water within the temperature range at which the reaction is carried out. Water is formed as a by-product of the reaction and such water of formation can be effectively removed as it is formed by azeotropic distillation when a solvent such as benzene or toluene is employed. Various other methods for eliminating water may conveniently be used such as utilizing dehydrating agents and the like.

The reaction will depend upon the interrelationship of a variety of factors including the temperature, pressure, quantity of reactants, and time of reaction employed. The duration of reaction or time of reaction depends principally upon the quantity or time of reaction depends principally upon the quantity of reactants and the reaction temperature. It is convenient to follow the reaction by observing (as by removing and collecting the water) the water of formation and when no further water is formed the reaction may be considered to be substantially complete.

The ratio or proportions of the reactants employed may vary over wide limits. Although equimolar quantities may be employed or either of the reactants can be used in major proportion, it is preferred practice to employ an excess of cyanoacetic acid or an excess of the trimethyl hexanal.

The temperature at which the reaction is conducted is above that of room temperature and may range from about 40° C. to about 180° C. While the temperature may vary over such a wide range it is generally preferred to use a temperature of from about 80° C. to about 140° C. so that the reaction can be completed in a convenient length of time while still obtaining good and satisfactory yields.

The process can be conducted over a range of pressures including atmospheric, sub-atmospheric or elevated pressures although elevated pressures are generally avoided so that by-products such as water are more conveniently removed and undesired products are suppressed.

The trimethyl-octenenitriles of this invention may be recovered and purified from the reaction residue by conventional separation techniques including selective extraction, solvation, distillation.

Generally, a mixture of trimethyl-octenenitriles containing varying proportions of Compounds I, II, III and IV can be effectively separated each from the other by such techniques as selective solvation or absorption and combinations thereof including chromatographic techniques.

It is possible, and in some instances desirable, to carry out the process such that the conjugated trimethyl-octenenitriles, Compounds I and II, predominate in the mixture, or such that the unconjugated trimethyl-octenenitriles, Compounds III and IV predominate. The course of the reaction in the predetermined direction, i.e. to a predominate mixture of conjugated or unconjugated octenenitriles, can be controlled by selection of the condensation catalyst. A major proportion of trimethyl-conjugated octenenitriles is obtained when the condensation catalyst is a basic amine catalyst such as pyridine. On the other hand, a major proportion of unconjugated octenenitriles is obtained when the condensation catalyst is an amine salt such as ammonium acetate.

The following examples will serve to illustrate the invention more fully, and they are not to be construed as limiting the scope of the invention.

EXAMPLE I

A stirred mixture of 68.1 kg. of 3,5,5-trimethyl hexanal, 55.4 kg. of cyanoacetic acid, 94 kg. of toluene and 5.55 kg. of ammonium acetate is heated to the reflux point during a period of two hours. The mixture is then refluxed for a period of two hours. The mixture is then refluxed for a period of 19 hours to collect an azeotropic mixture of toluene and water containing 7.9 liters of water. The reaction mixture is washed four times with an equal volume of brine. A total of 55.5 kg. of toluene is recovered at reduced pressure and the residue distilled at 2 mm. to give 55.6 kg. of crude product boiling at 40–150° C. This product is fractionated by distillation at 9:1 reflux ratio to give 5.4 kg. of unreacted 3,5,5-trimethyl hexanal and 40.3 kg. of the desired mixture of trimethyl-octenenitriles. This mixture is separated into its components by gas-liquid chromatography using helium as the gas and two five foot, one-quarter inch inside diameter tubes in tandem at 100° C. and a flow rate of 80 ml. per minute. The absorbent in the first tube is 5% polyethylene glycol (Carbowax 20 M) and in the second, 5% silicone rubber (SE 30 Gum Rubber). The mixture contains a preponderance of Compound III and Compound IV (the non-conjugated isomers).

EXAMPLE II

Into a 5 liter reaction flask equipped with stirrer, thermometer, reflux condenser and gas bubbler are added 600 g. of pyridine and 510 g. of cyanoacetic acid. The reaction mass is stirred and is allowed to heat up by itself to 40° C. The reaction mass is then cooled to room temperature and 936 g. of 3,5,5-trimethyl hexanal is added. The mass is then stirred for a period of one hour at room temperature and is then heated up to 100° C. The reaction mass is maintained at 100° C. for a period of five hours. The mass is then cooled and then transferred to a distillation flask. 4.0 g. of cupric acetate is added. The cupric acetate acts as a decarboxylation material. The pyridine is removed by distilling at 130° C. at atmospheric pressure. The residue is rushed over at 3 mm. pressure and the distillate fractionated to yield a mixture of isomeric unsaturated nitriles having a boiling point of 87–94° C./4 mm. Hg pressure.

The mixture is then separated into its components by gas-liquid chromatography using the procedure of Example I. The mixture from which the components are isolated contains 35% by weight of Compound I, 60% of Compound II and 5% of a mixture of Compounds III and IV.

EXAMPLE III

Into a 5 liter reaction flask equipped with stirrer, thermometer, reflux condenser and gas bubbler are added 600 g. of pyridine and 510 g. of cyanoacetic acid. The reaction mass is stirred and is allowed to heat up by itself to 40° C. The reaction mass is then cooled to room temperature and 936 g. of 3,5,5-trimethyl hexanal is added. The mass is then stirred for a period of one hour at room temperature and is then heated up to 100° C. The reaction mass is then cooled and transferred to a distillation flask. The pyridine is removed by distilling at 130° C. at atmospheric pressure. The residue is rushed over at 3 mm. pressure and the distillate is fractionated to yield a mixture of isomeric unsaturated nitriles having a boiling point of 87–94° C./4 mm. Hg pressure.

The mixture so obtained is separated into its components by gas-liquid chromatography in a thermal conductivity instrument, having a stainless steel column eight feet long by one-quarter inch inside diameter packed with 20% Carbowax 20 M absorbent (polyethylene glycol) coated on 60–80 mesh Chromasorb W (diatomaceous earth). The gas employed was helium at a flow rate of 100 ml. per minute and introduced at an inlet pressure of 40 p.s.i.g. The column temperature was 140° C., the sample size was 6 microliters, and the change speed was 30 inches per hour.

Four compounds were isolated and the following infrared characteristics for each were noted employing a Beckman IR–4 infra-red prism spectroscope in which the prism was sodium chloride and each of the samples was run neat as a thin film:

Compound I, cis-5,7,7-trimethyl-2-octene nitrile, displayed a C=C—CN band at 2220 cm.$^{-1}$, a

band at 740 cm.$^{-1}$, a

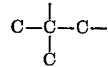

band at 1390, 1365 cm.$^{-1}$, and a CH$_3$ band at 1380 cm.$^{-1}$.

Compound II, trans-5,7,7-trimethyl-2-octene nitrile, displayed a —C=C—CN band at 2200 cm.$^{-1}$, a

band at 970 cm.$^{-1}$, and a

band at 1390, 1370 cm.$^{-1}$.

Compound III, cis-5,7,7, trimethyl-3-octene nitrile, displayed a —C—CN band at 2250 cm.$^{-1}$, a

band at 742 cm.$^{-1}$, a

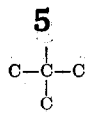

band at 1400, 1370 cm.$^{-1}$, and a $CH_2$—CN band at 1425 cm.$^{-1}$.

Compound IV, trans-5,7,7-trimethyl-3-octene nitrile, displayed a —C—CN band at 2250 cm.$^{-1}$, a

band at 970 cm.$^{-1}$, a

band at 1400, 1370 cm.$^{-1}$, and a $CH_2CN$ band at 1425 cm.$^{-1}$.

In addition each of the four isolated compounds were subjected to mass spectroscopy using a Consolidated Electrodynamics Company No. 21–103C machine and the following data was obtained:

FRAGMENTATION PATTERN
[Mol. wt.=150]

| Compound I | Compound II | Compound III | Compound IV |
|---|---|---|---|
| 57 | 57 | 57 | 57 |
| 41 | 41 | 41 | 41 |
| 29 | 43 | 67 | 43 |
| 39 | 29 | 71 | 29 |
| 67 | 67 | 29 | 69 |
| 150 | 27 | 27 | |

The trimethyl-octenenitriles of this invention are useful as fragrances. The trimethyl-octeneitriles may be employed in admixture with its isomers as obtained from the reaction mixture or the individual trimethyl-octenenitrile components may be employed alone. The trimethyl-octenenitriles contribute a fresh, green, cut grass odor having a fully carroty earthy note. The trimethyl-octenenitriles possess a clover, sweet-grass, and orris-like fragrance.

As olfactory agents the trimethyl-octenenitriles of this invention may be formualted into or used as components of a "perfume composition."

The term "perfume composition" is used herein to mean a mixture of organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the individual compounds of this invention, or mixtures thereof may be used to alter the aroma characteristics of a perfume composition, for example, by highlighting or moderating the olfactory reaction contributed by another ingredient in the composition.

The amount of mixtures or compounds of this invention which will be effective in perfume compositions depends on many factors, including the other ingredients, their amounts and the effects which are desired. It has been found that perfume compositions containing as little as 0.002% by weight of mixtures or compounds of this invention, or even less may be used to impart a clover, cut grass and orris-like odor to soaps, cosmetics and other products. The amount employed will depend on considerations of cost, nature of the end product, the effect desired on the finished product and the particular fragrance sought.

The trimethyl-octenenitriles may be used alone or in a perfume composition as olfactory components in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder, etc.

The following examples illustrate perfume mixtures, soap and other formulations within the scope of this invention. It is to be understood that these compositions are preferred examples, and the invention is not to be considered as restricted thereto except as indicated in the appended claims.

In the examples the soap base and soap chips used are unperfumed sodium based toilet soaps made from tallow and coconut oil. The detergent powder is a powder sold under the trademark RINSO. The liquid detergent is a product known as P-87 liquid detergent.

EXAMPLE IV

Preparation of soap compositions

A total of 100 g. of soap chips are mixed with 1 g. of each of the perfume compositions given below until a substantially homogeneous composition is obtained. Both soap compositions manifest a charatceristic clover, and sweet-grass-like odor with the composition containing the mixture from Example II having the more delicate aroma at some sacrifice in strength.

The perfume compositions consist of the following ingredients in the parts by weight indicated:

Mixture produced by the process of Examples I or
  II or III _____ 50
Linalool _____ 150
Oakmoss absolute _____ 30
Labdanum R _____ 25
Coumarin _____ 150
Dimethyl hydroquinone _____ 20
Linalyl acetate _____ 180
Lavender oil _____ 50
Tarragon oil _____ 5
Iso-butyl phenylacetate _____ 40
Amyl salicylate _____ 300

Similar results are obtained when the mixture of Examples I, II and III are replaced with one of the several components of the mixtures.

EXAMPLE V

Preparation of detergent composition

A total of 100 g. of a detergent powder are mixed with 0.15 g. of a perfume composition containing the mixture obtained in Example I until a substantially homogeneous composition having a clover, grass-like odor is obtained.

A similar result is obtained by replacing the mixture of Example I with the mixture produced using the procedure of Examples II or III or any components of any of the mixtures produced using the procedures of Examples I, II or III.

EXAMPLE VI

Preparation of cosmetic powder composition

A cosmetic powder is prepared by mixing 100 g. of talcum powder with 0.25 g. of the mixture obtained in Example II in a ball mill. A second cosmetic powder is similarly prepared except that the mixture produced in Example II is replaced with the mixture produced as a result of using the procedure of Examples I or III. Each of the cosmetic powders produced has a cut-grass, orris-like odor.

EXAMPLE VII

Liquid detergent containing trimethyl octenenitrile

Concentrated liquid detergents with a clover, cut-grass-like odor containing 0.2%, 0.5% and 1.2% of the product produced in accordance with Example I containing 5,5,7 - trimethyl - 3 - octenenitrile and 5,7,7-trimethyl-2-octenenitrile, are prepared by adding the appropriate quantity of the resulting mixture to the liquid detergent.

While the description of this invention has been given in terms of what are presently considered the preferred embodiments, it will be obvious to those skilled in the art that various changes and modifications can be made therein without departing from the spirit and scope of the invention. It is the intention therefore, that the appended claims cover all such changes and modifications as fall within the spirit and scope of the invention.

The trimethyl octene nitriles of this invention are also useful as insect attractants and insect lures. Such nitriles may be utilized to attract a variety of insects including the coddling moth (*Carpocapsa pomonella* [L.]). The trimethyl octenenitriles may be combined with adjuvants, extenders such as diatomaceous earth, clay, bentonite, kaolin, solvents, etc., other insect attractants and insecticides such as dichlorodiphenyl trichlorethane (DDT), chlordane, dimethoxydiphenyl trichorethane, piperonyl butoxide, pyrethrins, sulfur, hexachlorophene and the like. The attractants may be used in baits and lures and can be employed in any of the conventional manners as by impregnation of absorbent materials. The amounts employed for this purpose may vary over wide limits but it has been found that as little as 1 ml. of a trimethyl octene nitrile, such as 5,7,7-trimethyl-2-octenenitrile, impregnated on a 2" x 2" filter paper, is satisfactory for attracting insects such as the coddling moth.

What is claimed is:

1. A trimethyl-octenenitrile selected from the group consisting of cis - 5,7,7 - trimethyl-2-octenenitrile, trans-5,7,7-trimethyl - 2 - octenenitrile, cis - 5,7,7 - trimethyl-3-octenenitrile, and trans-5,7,7-trimethyl-3-octenenitrile.

2. A trimethyl octenenitrile as defined in claim 1, wherein the double bond is in the 2-position.

3. A trimethyl octenenitrile as defined in claim 1, wherein the double bond is in the 3-position.

4. A compound as defined in claim 1, wherein the trimethyl octene nitrile is:
   cis-5,7,7-trimethyl-2-octene-nitrile.

5. A compound as defined in claim 1, wherein the trimethyl octene nitrile is:
   trans-5,7,7-trimethyl-2-octene nitrile.

6. A compound as defined in claim 1, wherein the trimethyl octene nitrile is:
   cis-5,7,7-trimethyl-3-octene nitrile.

7. A compound as defined in claim 1, wherein the trimethyl octene nitrile is:
   trans-5,7,7-trimethyl-3-octene nitrile.

8. A mixture characterized by a green orris-like aroma consisting essentially of the conjugated nitriles cis-5,7,7-trimethyl-2-octene nitrile and trans - 5,7,7 - trimethyl-2-octene nitrile together with the unconjugated nitriles cis-5,7,7-trimethyl-3-octene nitrile and trans-5,7,7-trimethyl-3-octene nitrile prepared by reacting cyanoacetic acid with 3,5,5-hexanal in the presence of a condensation catalyst at an elevated temperature.

References Cited

UNITED STATES PATENTS

| | | | |
|---|---|---|---|
| 2,583,194 | 1/1952 | Weisler | 260—464 XR |
| 2,761,878 | 9/1956 | Huisman | 260—464 XR |
| 3,168,550 | 2/1965 | Blumenthal | 260—465.9 XR |

JOSEPH P. BRUST, Primary Examiner

U.S. Cl. X.R.
252—522; 424—84